(12) United States Patent
Mazoyer

(10) Patent No.: US 11,414,154 B2
(45) Date of Patent: Aug. 16, 2022

(54) FOLDABLE KICK SCOOTER

(71) Applicant: ID DEVELOPMENT LIMITED, Kowloon (HK)

(72) Inventor: Joseph Mazoyer, Lyons (FR)

(73) Assignee: ID Development Limited, Kln (HK)

( * ) Notice: Subject to any disclaimer, the term of this patent is extended or adjusted under 35 U.S.C. 154(b) by 251 days.

(21) Appl. No.: 16/804,030

(22) Filed: Feb. 28, 2020

(65) Prior Publication Data
US 2020/0277017 A1  Sep. 3, 2020

(30) Foreign Application Priority Data
Mar. 1, 2019  (CN) .......................... 201920263067.2

(51) Int. Cl.
*B62K 15/00*  (2006.01)
*B62K 3/00*  (2006.01)
*B62K 21/12*  (2006.01)

(52) U.S. Cl.
CPC ............ *B62K 15/006* (2013.01); *B62K 3/002* (2013.01); *B62K 21/12* (2013.01)

(58) Field of Classification Search
CPC ............................... B60K 3/002; B60K 15/006
See application file for complete search history.

(56) References Cited

U.S. PATENT DOCUMENTS 6,343,798 B1 * 2/2002 Chen ...................... B62K 3/002
280/5.26
6,428,021 B1 * 8/2002 Tung ...................... B62K 3/002
280/87.041

(Continued)

FOREIGN PATENT DOCUMENTS

| CN | 2908327 |   | 6/2007 |            |
|----|---------|---|--------|------------|
| CN | 2908327 Y | * | 6/2007 | ............. B62K 3/002 |
| CN | 201457624 |   | 5/2010 |            |
| CN | 201457624 U | * | 5/2010 |            |

(Continued)

*Primary Examiner* — Katy M Ebner
(74) *Attorney, Agent, or Firm* — Defillo & Associates, Inc.; Evelyn A. Defillo

(57) ABSTRACT

Embodiments of the invention disclose a foldable kick scooter, including a frontally positioned assembly, a deck assembly, and a folding mechanism. The deck assembly includes a deck support, and the folding mechanism includes a button and a folding support with a steering tube and two supporting plates, the two supporting plates being positioned opposite each other and both fixed to the steering tube. A connecting end of the deck support is rotatably connected between the two supporting plates, on which a positioning slot is provided. The button is slidably connected to the connecting end, and there are two positioning pins on the button that cooperate in a positioning manner, respectively, with the positioning slots on the two supporting plates. The folding is achieved by the cooperation by rotation between the two supporting plates and the connecting end, the structure is simple and the structural strength is ensured. The positional fixing between the frontally positioned assembly and the deck assembly can be achieved by the cooperation between the positioning pins and the positioning slots. A user needs only to press the button to make the positioning pins move out of the positioning slots, thus enabling the frontally positioned assembly and the deck assembly to rotate relative to each other to perform the folding. The operation is simple and convenient.

6 Claims, 5 Drawing Sheets

(56) References Cited

U.S. PATENT DOCUMENTS

| | | | |
|---|---|---|---|
| 7,011,319 B2* | 3/2006 | Lu | B62K 3/002 |
| | | | 280/87.041 |
| 7,584,974 B2* | 9/2009 | Jackman | B62K 3/002 |
| | | | 180/181 |
| 8,113,525 B2* | 2/2012 | Lin | B62K 15/006 |
| | | | 280/87.041 |
| 10,407,119 B1* | 9/2019 | Greenberg | B62K 15/006 |
| D914,102 S * | 3/2021 | Hadley | D21/423 |
| 2002/0096847 A1* | 7/2002 | Shaw | B62K 15/006 |
| | | | 280/87.041 |
| 2009/0230648 A1* | 9/2009 | Chan | B62K 3/002 |
| | | | 280/87.041 |
| 2011/0031710 A1* | 2/2011 | Lin | B62K 15/006 |
| | | | 280/87.05 |
| 2015/0375821 A1* | 12/2015 | Wu | B62K 15/006 |
| | | | 280/639 |
| 2016/0368558 A1* | 12/2016 | Xu | B62K 3/002 |
| 2018/0186424 A1* | 7/2018 | Sung | B62K 15/00 |
| 2019/0263468 A1* | 8/2019 | Huang | B62M 11/02 |
| 2020/0277017 A1* | 9/2020 | Mazoyer | B62K 3/002 |
| 2020/0298928 A1* | 9/2020 | Liao | B62K 15/006 |

FOREIGN PATENT DOCUMENTS

| | | | |
|---|---|---|---|
| CN | 201506430 | | 6/2010 |
| CN | 201506430 U | * | 6/2010 |
| CN | 207631416 | | 7/2018 |
| CN | 207631416 U | * | 7/2018 |

* cited by examiner

FOLDABLE KICK SCOOTER

TECHNICAL FIELD

The invention relates to a kick scooter, in particular, to a foldable kick scooter.

BACKGROUND

Kick scooters are mainly for children to use. How to facilitate the carriage and storage management of a kick scooter is a problem that parents of children will necessarily care about. As a result, foldable kick scooters have emerged. The folding mechanism of foldable kick scooters in the prior art is complicated and difficult to operate.

SUMMARY OF THE INVENTION

The technical problem that embodiments of the invention aims to resolve is to provide a foldable kick scooter that achieves a simple structure and is at the same time convenient to operate.

Embodiments of the invention provide a foldable kick scooter comprising a frontally positioned assembly, a deck assembly, and a folding mechanism connected between the frontally positioned assembly and the deck assembly; wherein:

the deck assembly comprises a deck support that has a connecting end oriented towards the frontally positioned assembly;

the folding mechanism comprises a button and a folding support comprising a steering tube to which the frontally positioned assembly is rotatably connected and two supporting plates; the two supporting plates are positioned opposite each other and are both fixed to the steering tube; the connecting end is rotatably connected between the two supporting plates, and its rotary axial direction is perpendicular to a plate surface of the supporting plates; the supporting plates have an arc-shaped end face positioned to be oriented towards the deck assembly, on which end face a positioning slot is provided;

the button is slidably connected to the connecting end so as to move towards or away from the frontally positioned assembly; there are two positioning pins on the button that cooperate in a positioning manner, respectively, with the positioning slots of the two supporting plates; when the button is in a position that is relatively near the frontally positioned assembly, the positioning pins are inside the positioning slots; when the button slides to a position that is relatively far away from the frontally positioned assembly, the positioning pins are outside the positioning slots, and the frontally positioned assembly and the folding support can rotate relative to the deck support.

In the scooter, there are two positioning slots provided on each of the supporting plates, namely, a first positioning slot, and a second positioning slot, and they are arranged along an arc of the arc-shaped end faces; when the positioning pins are in the first positioning slots, the frontally positioned assembly and the deck assembly are in an unfolded state in which they are far away from each other; when the positioning pins are in the second positioning slots, the frontally positioned assembly and the deck assembly are in a folded state in which they are near each other.

In the scooter, a spring is provided between the button and the connecting end for providing the button with an elastic force towards the frontally positioned assembly.

In the scooter, the connecting end is tube-shaped, and the button comprises a pressing element and a sliding mass; the sliding mass is slidably provided in the connecting end, its sliding direction being the axial direction of the connecting end, the two positioning pins being both fixed to the sliding mass; the pressing element is located at an external side of the tube of the connecting end and fixed to the sliding mass via a connecting element; a tube wall of the connecting end is provided with a first bar-shaped slot and two second bar-shaped slots that are all provided along a sliding direction of the sliding mass; the connecting element is slidably provided through the first bar-shaped slot; the two positioning pins are slidably provided through the second bar-shaped slots respectively and extend to the external side of the tube of the connecting end.

In the scooter, the cross section of the connecting end is square-shaped, and the sliding mass is in the form of a cube.

In the scooter, the deck support is generally tube-shaped, and an end of the deck support that is oriented towards the frontally positioned assembly bends upwards to form the connecting end which is inclined.

In the scooter, the pressing element comprises a connecting plate that is connected in parallel with the sliding mass, and a boss that is formed integrally with the connecting plate and protrudes towards a direction away from the connecting end.

In the scooter, the deck assembly further comprises a deck extending to the connecting end, a receiving hole in which the entire boss is located being provided at a location on the deck that corresponds to the button.

In the scooter, the folding support is covered at its outside by an external cover, an arc-shaped boss being provided at an inner side of the external cover, the arc-shaped boss and the arc-shaped end face being positioned opposite each other, and forming, between them, a space for the positioning pins to move.

By implementing embodiments of the invention, the folding is achieved by the cooperation by rotation between the two supporting plates and the connecting end, the structure is simple and the structural strength is ensured. The positional fixing between the frontally positioned assembly and the deck assembly can be achieved by the cooperation between the positioning pins and the positioning slots. A user needs to only press the button to make the positioning pins move out of the positioning slots, thus enabling the frontally positioned assembly and the deck assembly to rotate relative to each other so as to perform the folding. The operation is simple and convenient.

BRIEF DESCRIPTION OF THE DRAWINGS

To more clearly describe the technical solutions of embodiments of the invention or of the prior art, the accompanying drawings that need to be used in embodiments of the invention or the prior art are described below.

DETAILED DESCRIPTION OF EMBODIMENTS

Embodiments of the invention are described in reference to the accompanying drawings in the embodiments of the invention.

Figure 1:
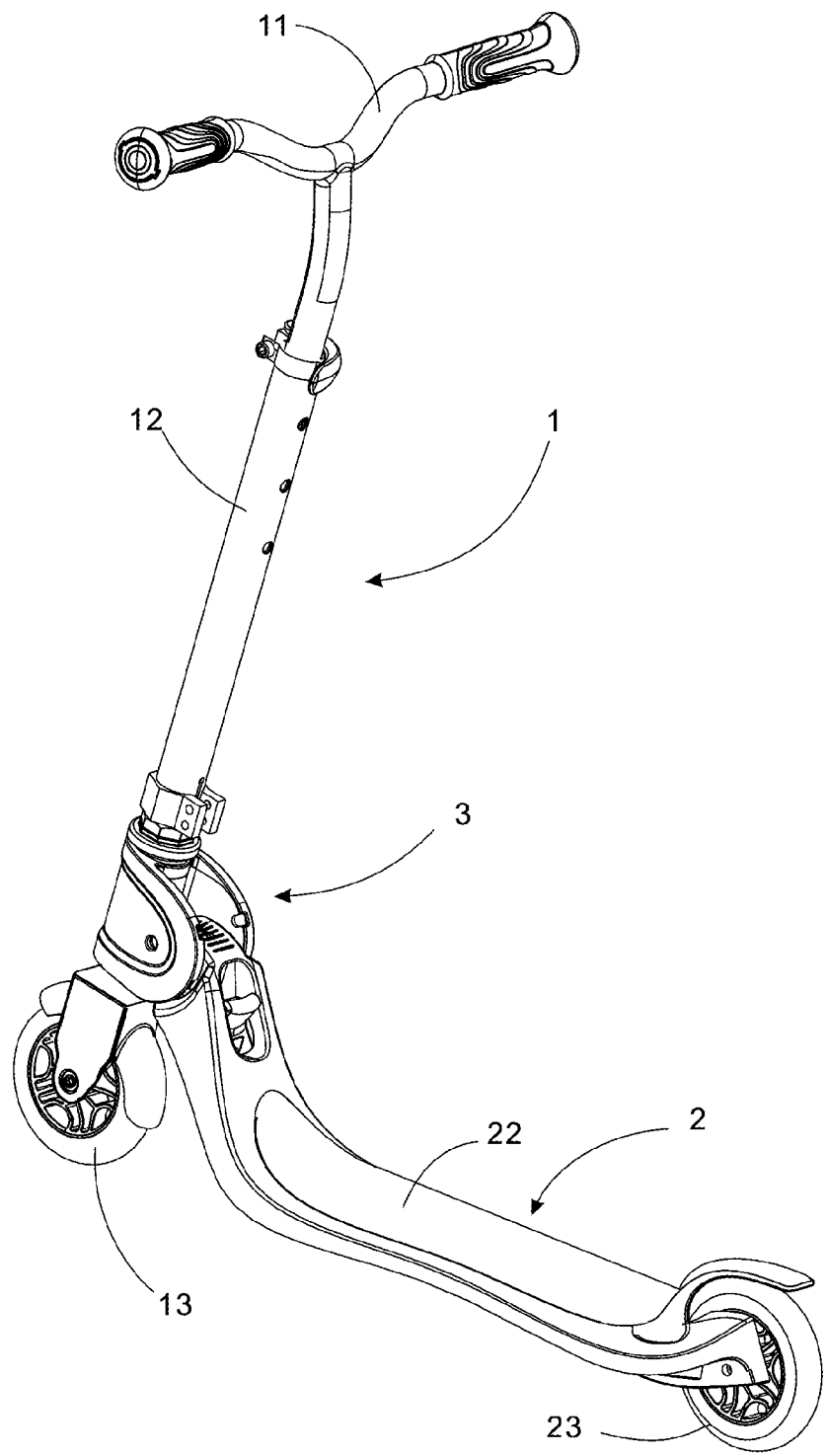
FIG. 1 is a schematic structural view of a foldable kick scooter provided by a preferred embodiment of the invention.

As shown in FIG. 1, a preferred embodiment of the invention discloses a foldable kick scooter comprising a frontally positioned assembly 1, a deck assembly 2, and a folding mechanism 3 connected between the frontally positioned assembly 1 and the deck assembly 2. Thanks to the folding mechanism 3, it is possible to fold and unfold the foldable kick scooter.

Figure 2:
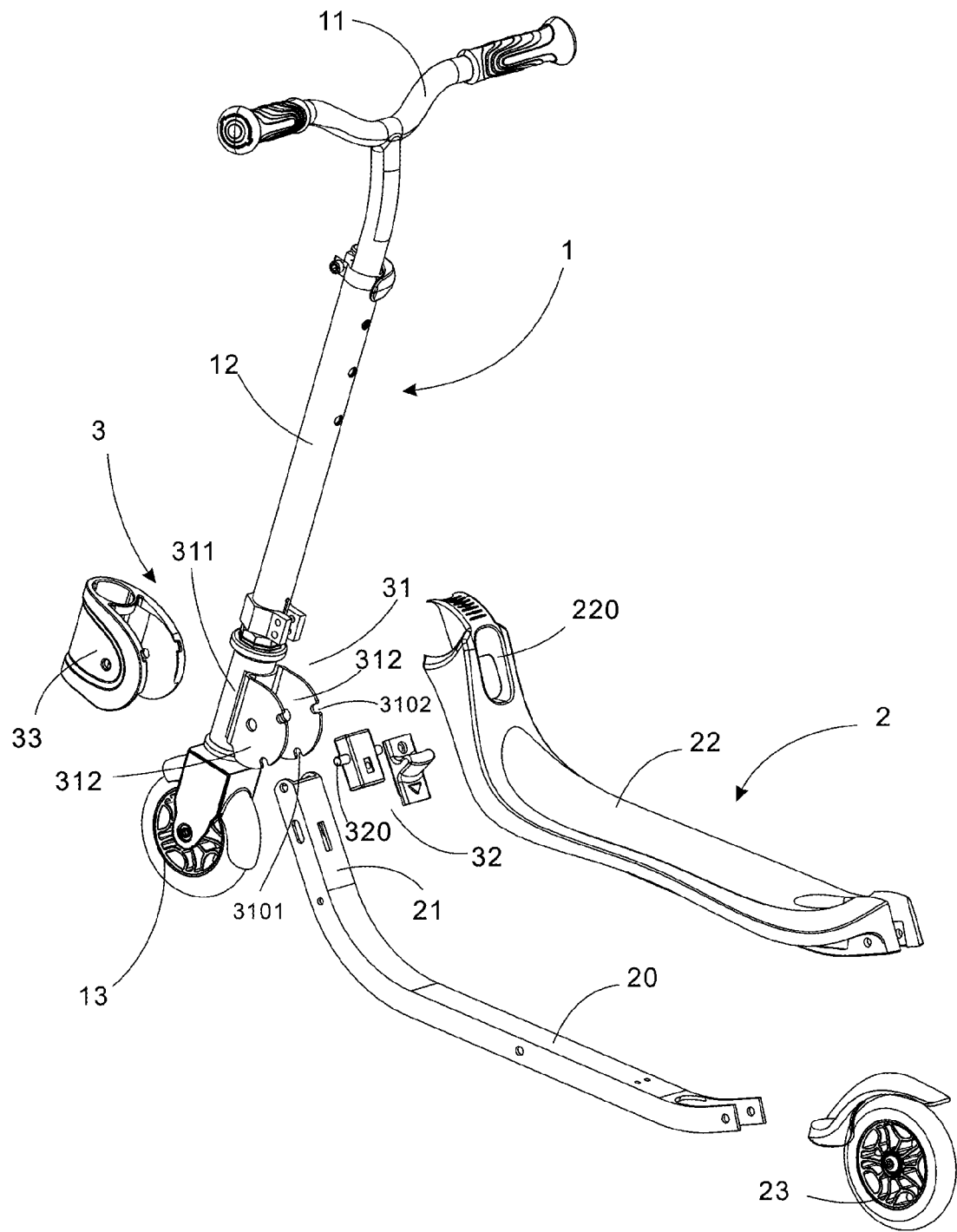
FIG. 2 is a schematic exploded structural view of the foldable kick scooter of FIG. 1.

In reference to FIGS. 1 and 2, the frontally positioned assembly 1 comprises a handlebar 11, a stand column 12 and a front wheel 13. The handlebar 11 is fixed to a top end of the stand column 12 and the front wheel 13 is rotataby connected to a bottom end of the stand column 12. A user can use the handlebar 11 to drive the stand column 12 and the front wheel 13 to rotate relative to the folding mechanism 3 and the deck assembly 2, thus achieving steering.

As shown in FIG. 2, the deck assembly 2 comprises a deck support 20 that has a connecting end 21 oriented towards the frontally positioned assembly 1, by means of which end a rotary connection with the folding mechanism 3 can be achieved. Further, the deck assembly 2 further comprises a deck 22 and a rear wheel 23. The deck 22 is fixed to the deck support 20.

The end of the deck support 20 that is opposite to the connecting end 21 (i.e., the rear end of the deck support 20) is rotatably connected with the rear wheel 23.

Figure 3:
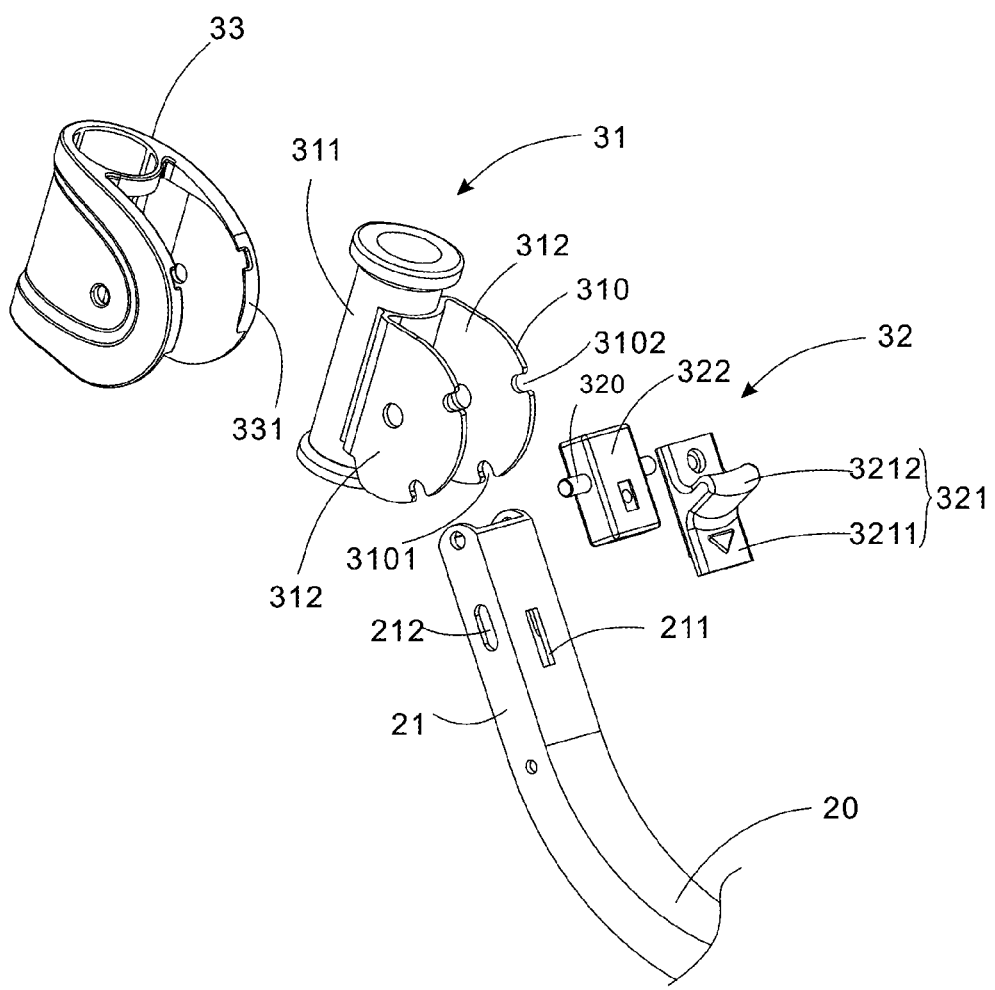
FIG. 3 is a schematic exploded structural view of the folding mechanism and the deck support of the foldable kick scooter of FIG. 2.

In reference to FIGS. 2 and 3, the folding mechanism 3 comprises a folding support 31 and a button 32. The frontally positioned assembly 1 is rotatably connected to the folding support 31. The rotation of the frontally positioned assembly 1 relative to the folding support 31 can achieve the steering of the foldable kick scooter. The folding support 31 is rotatably connected with the connecting end 21. The button 32 is capable of sliding to achieve the locking and unlocking of the relative position of the folding support 31 and the connecting end 21.

The folding support 31 comprises a steering tube 311 and two supporting plates 312. The frontally positioned assembly 1 is rotatably connected to the steering tube 311. More specifically, the steering tube 311 is sleeved to the stand column 12 of the frontally positioned assembly 1. The stand column 12 is capable of rotating around its own axial direction relative to the steering tube 311, so as to enable the whole of the frontally positioned assembly 1 to rotate relative to the steering tube 311.

The two supporting plates 312 are positioned to be parallel with and opposite to each other, and are both fixed to the steering tube 311. In the embodiment, preferably, the two supporting plates 312 are integrally formed with the steering tube 311 to increase the connecting strength. The connecting end 21 is rotatably connected between the two supporting plates 312, with its rotary axial direction perpendicular to the plate surface of the supporting plates 312. The supporting plates 312 have an arc-shaped end face 310 provided to be oriented towards the deck assembly 2, on which face positioning slots 3101 and 3102 are provided.

The button 32 is slidably connected to the connecting end 21 so as to move towards or away from the frontally positioned assembly 1. There are two positioning pins 320 on the button 32 that cooperate in a positioning manner, respectively, with the positioning slots on the two supporting plates 312. When the button 32 slides to a position that is relatively near the frontally positioned assembly 1, the positioning pins 320 are inside the positioning slots 3101/3102, and the frontally positioned assembly 1 and the folding support 31 are fixed in position relative to the deck support 20 and unable to rotate. When the button 32 slides to a position that is relatively far away from the frontally positioned assembly 1, the positioning pins 320 are outside the positioning slots, and the frontally positioned assembly 1 and the folding support 31 can rotate relative to the deck support 20.

In the embodiment of the invention, the folding is achieved through the cooperation by rotation between the two supporting plates 312 and the connecting end 21, and the structure is simple and the structural strength can be ensured; the position of the frontally positioned assembly 1 relative to the deck assembly 2 can be fixed through the cooperation between the positioning pins 320 and the positioning slots 3101/3102. A user needs only to press the button 32 to make the positioning pins 320 move out of the positioning slots 3101/3102, thus enabling the frontally positioned assembly 1 and the deck assembly 2 to rotate relative to each other in order to perform the folding. The operation is simple and convenient.

Figure 4:
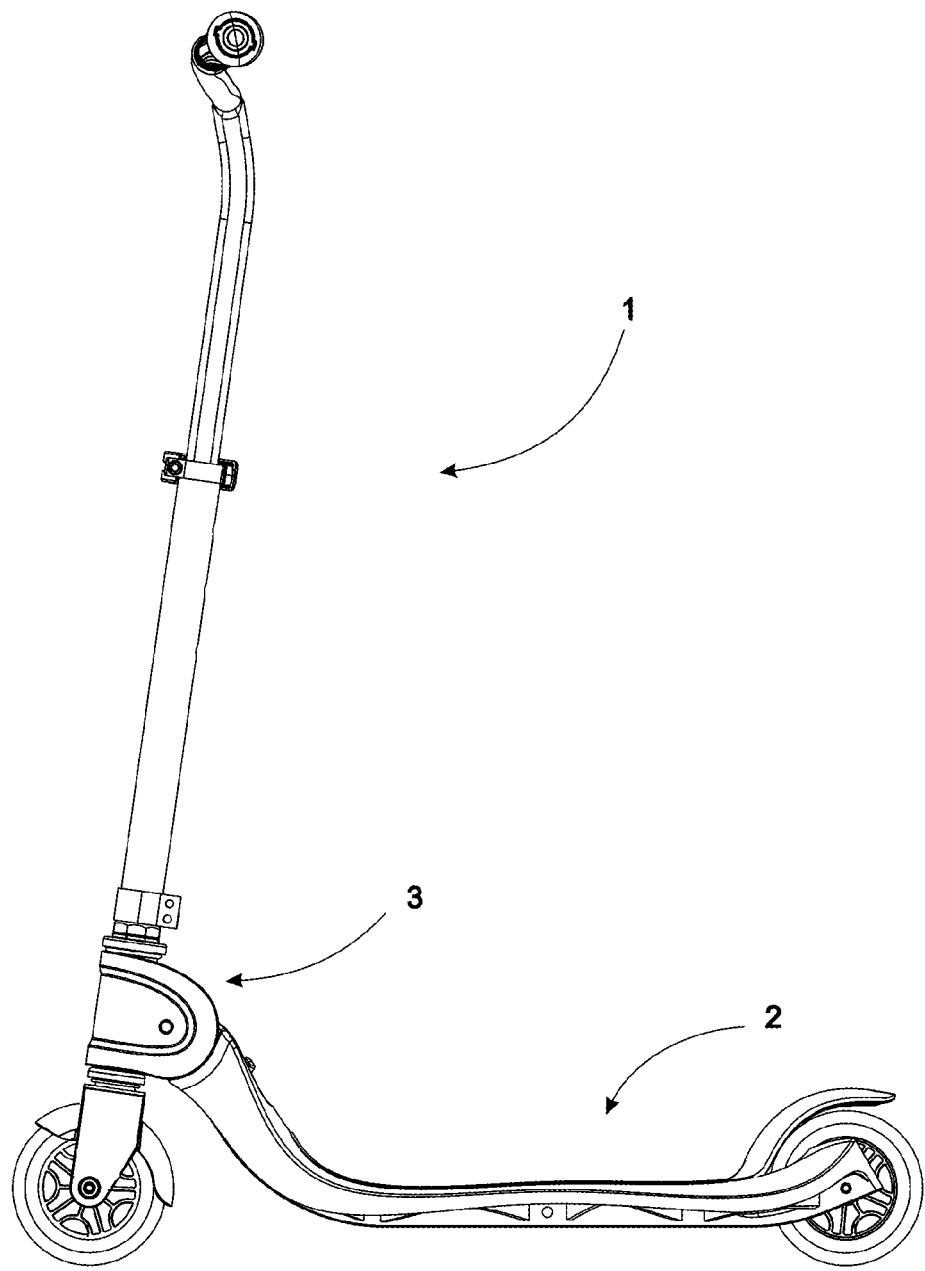
FIG. 4 is a schematic structural view of a foldable kick scooter provided by a preferred embodiment of the invention in an unfolded state.
Figure 5:
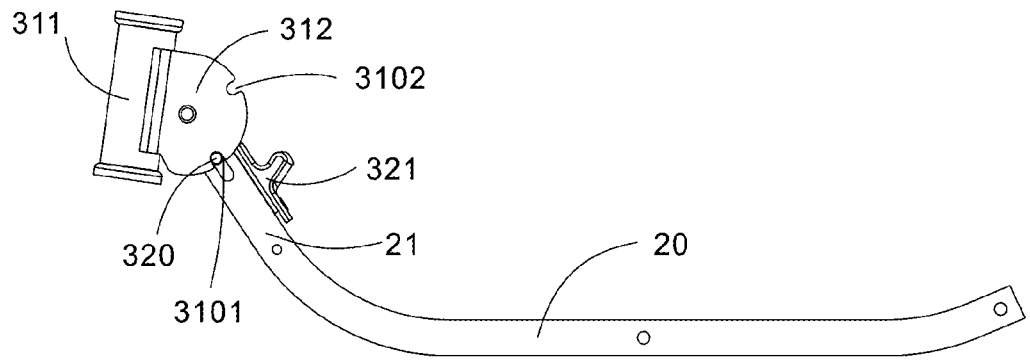
FIG. 5 is a schematic structural view of the folding mechanism and the deck support of the foldable kick scooter of FIG. 4 in the unfolded state.
Figure 6:
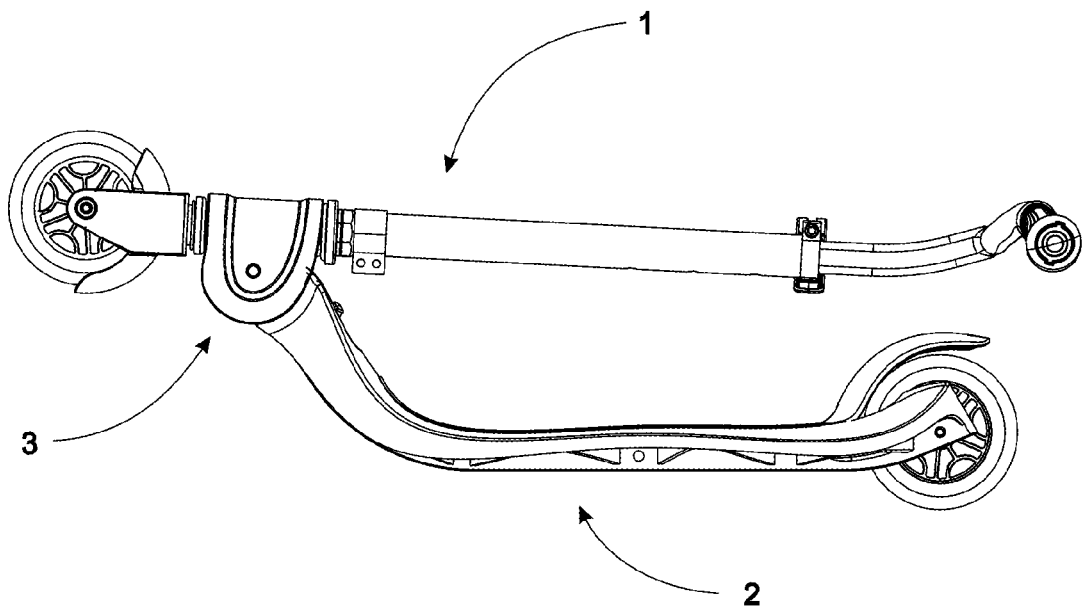
FIG. 6 is a schematic structural view of a foldable kick scooter provided by a preferred embodiment of the invention in a folded state.
Figure 7:
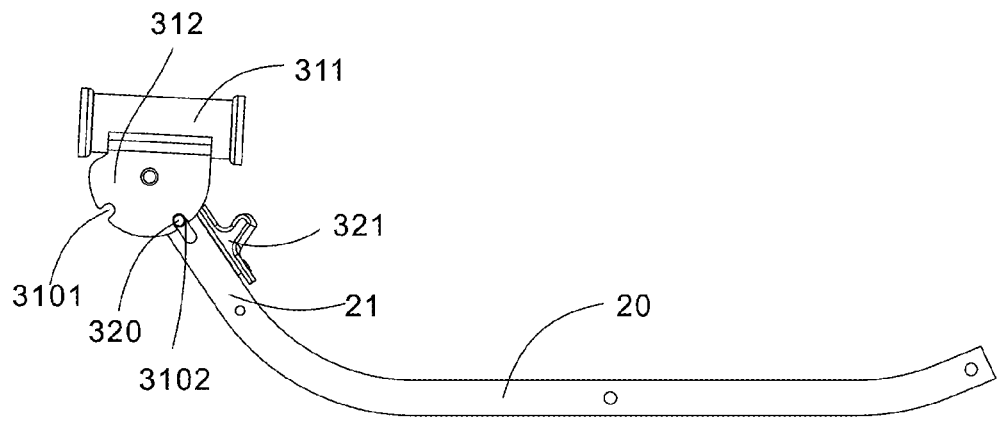
FIG. 7 is a schematic structural view of the folding mechanism and the deck support of the foldable kick scooter of FIG. 4 in the folded state.

Preferably, as shown in FIG. 3, there are two positioning slots provided on each of the supporting plates 312, namely, a first positioning slot 3101 and a second positioning slot 3102, and they are arranged along the arc of the arc-shaped end face 310. In reference to FIGS. 4 and 5, when the positioning pins 320 are in the first positioning slots 3101, the scooter is in an unfolded state in which the frontally positioned assembly 1 and the deck assembly 2 are far away from each other. In reference to FIGS. 6 and 7, when the positioning pins 320 are in the second positioning slots 3102, the scooter is in a folded state in which the frontally positioned assembly 1 and the deck assembly 2 are near each other. Thanks to the first positioning pins 3101 and the second positioning pins 3102, the foldable kick scooter can be positioned respectively in the folded state and in the unfolded state, to facilitate utilization. Here, in other modes of realization, there can also be provided only one positioning slot for ensuring the unfolded state, or more than three positioning slots so as to position the foldable kick scooter at multiple angular positions.

In the present embodiment, a spring (not shown) is provided between the button 32 and the connecting end 21 for providing the button 32 with an elastic force towards the frontally positioned assembly 1. Thanks to the spring, the positioning pins 320 can be maintained in the positioning slots 3101/3102, and when the frontally positioned assembly 1 rotates relative to the deck assembly 2 to a preset position, the positioning pins 320 can automatically enter the positioning slots 3101/3102. The button 32 is pressed to slide so as to overcome the elastic force and move the positioning pins 320 out of the position slots 3101/3102, enabling the frontally positioned assembly 1 and the folding support 31 to rotate relative to the deck assembly 2. Here, in other modes of realization, a magnet can also be provided in the positioning slots, and the positioning pins 320 are provided with an iron material or magnet, so as to use a magnetic force to position the positioning pins 320 in the positioning slots. Alternatively, the positioning slots are snap-fit slots in which the positioning pins 320 are positioned in a snap-fit manner.

In the present embodiment, as shown in FIG. 3, the connecting end 21 is tube-shaped, and the button 32 comprises a pressing element 321 and a sliding mass 322. The sliding mass 322 is slidably provided in the connecting end 21 with its sliding direction being the axial direction of the connecting end 21, the two positioning pins 320 being both fixed to the sliding mass 322. The pressing element 321 is located at the external side of the tube of the connecting end 21. The pressing element 321 is fixed to the sliding mass 322 via a connecting element (not shown in the figures). The tube wall of the connecting end 21 is provided with a first bar-shaped slot 211 and two second bar-shaped slots 212 that are all provided along the sliding direction of the sliding mass 322. The connecting element is slidabaly provided through the first bar-shaped slot 211. The two positioning pins 320 are slidabaly provided through, respectively, the second bar-shaped slots 212, and extend to the external side of the tube of the connecting end 21. Here, the connecting element can be a bolt, a screw, a connecting mass, etc.

Thanks to the sliding of the sliding mass 322 inside the tube-shaped connecting end 21, the overall stability of the sliding of the button 32 is ensured. Since the pressing element 321 being outside the tube of the connecting end 21, it will be convenient for a user to press the pressing element 321 to make the button 32 slide.

The cross section of the connecting end 21 is square-shaped so that the connecting end 21 is in the form of a square tube, and the sliding mass 322 is in the form of a cube so as to facilitate the connection between the connecting end 21 and the button 32, and that between the connecting end 21 and the folding support.

Preferably, as shown in FIG. 2, the deck support 20 is generally tube-shaped, and the end of the deck support 20 that is oriented towards the frontally positioned assembly 1 bends upwards to form the inclined connecting end 21 so as to increase the overall structural strength. The inclined connecting end 21 facilitates the connection between the connecting end 21 and the folding mechanism 3 and makes the sliding direction of the button 32 also be inclined so as to make it easier for a user to press hard the button 32 downwards.

Further, as shown in FIG. 3, the pressing element 321 comprises a connecting plate 3211 that is connected in parallel with the sliding mass 322, and a boss 3212 that is formed integrally with the connecting plate 3211 and protrudes towards the direction away from the connecting end 21. Thanks to the connecting plate 3211, the stability of the sliding of the button 32 can be further ensured. A user's finger can exert a force to the boss 3212 to make the button 32 slide.

As shown in FIG. 2, the deck 22 extends to the connecting end 21, and a receiving hole 220 in which the entire boss 3212 is located is provided at a location on the deck 22 that corresponds to the button 32. Thanks to the front end of the deck 22, the button 32 can be protected, preventing the button 32 from being triggered by error when a user uses the foldable kick scooter.

As shown in FIG. 3, the outside of the folding support 31 is covered by an external cover 33. An arc-shaped boss 331 is provided at the inner side of the external cover 33. The arc-shaped boss 331 and the arc-shaped end face 310 are positioned opposite each other, and form, between them, a sliding slot inside which a space for the positioning pins 320 to move is formed. Thanks to the external cover 33, the entire folding support 31 can be housed, and the parts moving during the folding can be protected, preventing the folding process from being affected by the external environment.

What has been described are merely preferred embodiments of the invention, and of course cannot be used to limit the scope claimed of the invention. Therefore, equivalent changes made according to the claims of the invention fall within the scope covered by the invention.

The invention claimed is:

1. A foldable kick scooter comprising: a frontally positioned assembly, a deck assembly, and a folding mechanism connected between the frontally positioned assembly and the deck assembly;

the deck assembly comprises a deck support that has a connecting end oriented towards the frontally positioned assembly;

the folding mechanism comprises a button and a folding support comprising a steering tube to which the frontally positioned assembly is rotatably connected and two supporting plates; the two supporting plates are positioned opposite to each other and are both fixed to the steering tube; the connecting end is rotatably connected between the two supporting plates, and its rotary axial direction is perpendicular to a plate surface of the supporting plates; the supporting plates have an arc-shaped end face positioned to be oriented towards the deck assembly, on which end face a positioning slot is provided;

a button is slidably connected to the connecting end so as to move towards or away from the frontally positioned assembly; two positioning pins are located on the button that cooperate in a positioning manner, respectively, with the positioning slots of the two supporting plates; when the button is in a position that is relatively near the frontally positioned assembly, the positioning pins are inside the positioning slots; when the button slides to a position that is relatively far away from the frontally positioned assembly, the positioning pins are outside the positioning slots, and the frontally positioned assembly and the folding support can rotate relative to the deck support;

wherein the connecting end is tube-shaped, and the button comprises a pressing element and a sliding mass; the sliding mass is slidably provided in the connecting end, its sliding direction being the axial direction of the connecting end, the two positioning pins being both fixed to the sliding mass, the pressing element is located at an external side of the tube of the connecting end and fixed to the sliding mass via a connecting element; a tube wall of the connecting end is provided with a first bar-shaped slot and two second bar-shaped slots that are all provided along a sliding direction of the sliding mass; the connecting element is slidably provided through the first bar-shaped slot; the two positioning pins are slidably provided through the second bar-shaped slots respectively and extend to the external side of the tube of the connecting end;

wherein the pressing element comprises a connecting plate connected in parallel with the sliding mass, and a boss that is formed integrally with the connecting plate, and protrudes towards a direction away from the connecting end; and wherein the deck assembly further comprises a deck extending to the connecting end, a receiving hole in which the entire boss is located being provided.

2. The foldable kick scooter of claim 1, wherein the two positioning slots provided on each of the supporting plates are arranged along an arc of the arc-shaped end faces; when the positioning pins are in the first positioning slots, the frontally positioned assembly and the deck assembly are in an unfolded state in which they are far away from each other; when the positioning pins are in the second positioning slots, the frontally positioned assembly and the deck assembly are in a folded state in which they are near each other.

3. The foldable kick scooter of claim 1, wherein a spring is provided between the button and the connecting end for providing the button with an elastic force towards the frontally positioned assembly.

4. The foldable kick scooter of claim 1, wherein the cross section of the connecting end is square-shaped, and the sliding mass is in the form of a cube.

5. The foldable kick scooter of claim 1, wherein the deck support is tube-shaped, and an end of the deck support that is oriented towards the frontally positioned assembly bends upwards to form the connecting end which is inclined.

6. The foldable kick scooter of claim 1, wherein the folding support is covered outside by an external cover, an arc-shaped boss being provided at an inner side of the external cover, the arc-shaped boss and the arc-shaped end face being positioned opposite each other, and forming, between them, a space for the positioning pins to move.

* * * * *